United States Patent
Kosaka

(10) Patent No.: US 10,048,654 B2
(45) Date of Patent: Aug. 14, 2018

(54) TORQUE CONTROL APPARATUS

(71) Applicant: Toyota Jidosha Kabushiki Kaisha, Toyota-shi, Aichi-ken (JP)

(72) Inventor: Yusuke Kosaka, Chofu (JP)

(73) Assignee: Toyota Jidosha Kabushiki Kaisha, Toyota-shi (JP)

(*) Notice: Subject to any disclaimer, the term of this patent is extended or adjusted under 35 U.S.C. 154(b) by 0 days.

(21) Appl. No.: 15/840,193

(22) Filed: Dec. 13, 2017

(65) Prior Publication Data
US 2018/0181083 A1    Jun. 28, 2018

(30) Foreign Application Priority Data
Dec. 27, 2016    (JP) ................. 2016-252590

(51) Int. Cl.
    *H02P 27/08*    (2006.01)
    *B60L 15/10*    (2006.01)
    *G05B 5/01*    (2006.01)
    *G05B 11/32*    (2006.01)

(52) U.S. Cl.
CPC ............... *G05B 5/01* (2013.01); *G05B 11/32* (2013.01); *G05B 2219/37344* (2013.01); *G05B 2219/39001* (2013.01)

(58) Field of Classification Search
CPC ............. B60L 3/106; H02P 3/06; H02P 27/08
See application file for complete search history.

(56) References Cited

U.S. PATENT DOCUMENTS

| | | | |
|---|---|---|---|
| 2013/0184918 A1* | 7/2013 | Motosugi | B60L 15/20 701/22 |
| 2014/0200771 A1* | 7/2014 | Yabuguchi | B62D 5/0493 701/41 |
| 2014/0217951 A1* | 8/2014 | Sugihara | G05B 19/19 318/600 |
| 2015/0175193 A1* | 6/2015 | Endo | B62D 5/0481 701/29.2 |
| 2015/0226627 A1* | 8/2015 | Kuwahara | B62D 5/049 701/41 |
| 2016/0332660 A1* | 11/2016 | Sasaki | B62D 5/0484 |

FOREIGN PATENT DOCUMENTS

| | | |
|---|---|---|
| JP | 2003-101413 A | 4/2003 |
| JP | 2004-352164 A | 12/2004 |

* cited by examiner

*Primary Examiner* — Bickey Dhakal
*Assistant Examiner* — Charles S Laughlin
(74) *Attorney, Agent, or Firm* — Dinsmore & Shohl LLP

(57) ABSTRACT

A torque control apparatus includes a torque command output unit including a first low pass filter configured to cut off a torque command value by a first frequency, and a switching unit configured to switch, when a first torque value detected by a first torque sensor satisfies a predetermined condition, a second torque value detected by a second torque sensor to the torque command output unit. The switching unit includes a second low pass filter configured to cut off the second torque value by a second frequency which is higher than the first frequency and output the obtained value to the torque command output unit, uses the second low pass filter for a predetermined period of time after the switching, and outputs the second torque value to the torque command output unit without using the second low pass filter after the predetermined period of time has passed.

1 Claim, 3 Drawing Sheets

TORQUE CONTROL APPARATUS

CROSS REFERENCE TO RELATED APPLICATIONS

This application is based upon and claims the benefit of priority from Japanese patent application No. 2016-252590, filed on Dec. 27, 2016, the disclosure of which is incorporated herein in its entirety by reference.

BACKGROUND

The present disclosure relates to a torque control apparatus.

Japanese Unexamined Patent Application Publication No. 2004-352164 discloses a control apparatus including two kinds of calculation means as signal processing means in order to suppress occurrence of a sudden change in an input value when a command value is output to a motor in response to a specific signal, the control apparatus processing signals by switching the two kinds of calculation means as appropriate. A low pass filter (LPF) is provided after the stage at which the two kinds of calculation means are provided but before the stage at which the command value to be sent to the motor is calculated.

SUMMARY

According to the technique disclosed in Japanese Unexamined Patent Application Publication No. 2004-352164, even in a case in which, when one of a plurality of torque sensors has a failure, another torque sensor is used, since the LPF is provided after the stage at which the sensors to be used are switched, it is possible to reduce the difference between output values for each sensor. The LPF may be used not only to pass a torque sensor value therethrough but also to perform accurate control using torque sensors (e.g., to remove resonance of devices connected by the torque sensors).

However, since a signal after it has been subjected to the processing in the LPF is delayed compared to the original signal, the processing rate of the whole control system is reduced. Therefore, even when the plurality of torque sensors are switched to be used, it is difficult to accurately perform torque control by the torque sensors while minimizing the influence caused by the delay in the LPF.

Embodiments of the present disclosure have been made in order to solve the aforementioned problem and aims to provide a torque control apparatus for accurately performing torque control by torque sensors while minimizing the influence caused by the delay in the LPF when a plurality of torque sensors are switched to be used.

A torque control apparatus according to the present disclosure includes: a motor including a load arranged at a tip part thereof and outputting torque based on a current that is input thereto; a plurality of torque sensors each configured to detect an output value of the torque output from the motor; a torque command output unit configured to calculate a torque command value based on a target position of the load and the output value of the torque detected by one of the plurality of torque sensors; and a current controller configured to control the current based on the torque command value. The torque command output unit includes a first low pass filter configured to cut off the torque command value by a first frequency and output the obtained value to the current controller, the torque control apparatus further includes a switching unit configured to switch, when a first torque value detected by a first torque sensor among the plurality of torque sensors satisfies a predetermined condition, a second torque value detected by a second torque sensor to the torque command output unit, the switching unit includes a second low pass filter configured to cut off the second torque value by a second frequency and output the obtained value to the torque command output unit, the switching unit uses the second low pass filter for a predetermined period of time after the switching, and outputs the second torque value to the torque command output unit without using the second low pass filter after the predetermined period of time has passed, and the second frequency is higher than the first frequency.

According to the present disclosure, it is possible to provide a torque control apparatus for accurately performing torque control by torque sensors while minimizing the influence caused by the delay in the LPF when a plurality of torque sensors are switched to be used.

The above and other objects, features and advantages of the present disclosure will become more fully understood from the detailed description given hereinbelow and the accompanying drawings which are given by way of illustration only, and thus are not to be considered as limiting the present disclosure.

DETAILED DESCRIPTION

In the following description, with reference to the drawings, specific embodiments including the aforementioned aspects to which the present disclosure has been applied will be described in detail. Throughout the drawings, the same components are denoted by the same reference symbols and overlapping descriptions will be omitted as necessary for the sake of clarification of the description.

First Embodiment of Present Disclosure

In the aforementioned Japanese Unexamined Patent Application Publication No. 2004-352164, the low pass filter (LPF) is provided after the stage at which the outputs of the two control calculation means are switched, to thereby suppress a sudden change in the input to the following motor driver. When the output of the control calculation means is switched, a sudden change occurs in the signal. In order to suppress this change, an LPF having a specific cutoff frequency is provided in the output of the control calculation means. However, since the LPF is always provided during a normal operation in which the output is not switched, the output signal is always delayed.

On the other hand, according to the present disclosure, when feedback is performed by switching a plurality of torque sensor values, the low pass filter is used only when the toque sensor values are switched. Accordingly, in the normal operation, a fast torque sensor signal is obtained, and a sudden change in the torque sensor signal is suppressed when the torque sensor values are switched.

Figure 1:
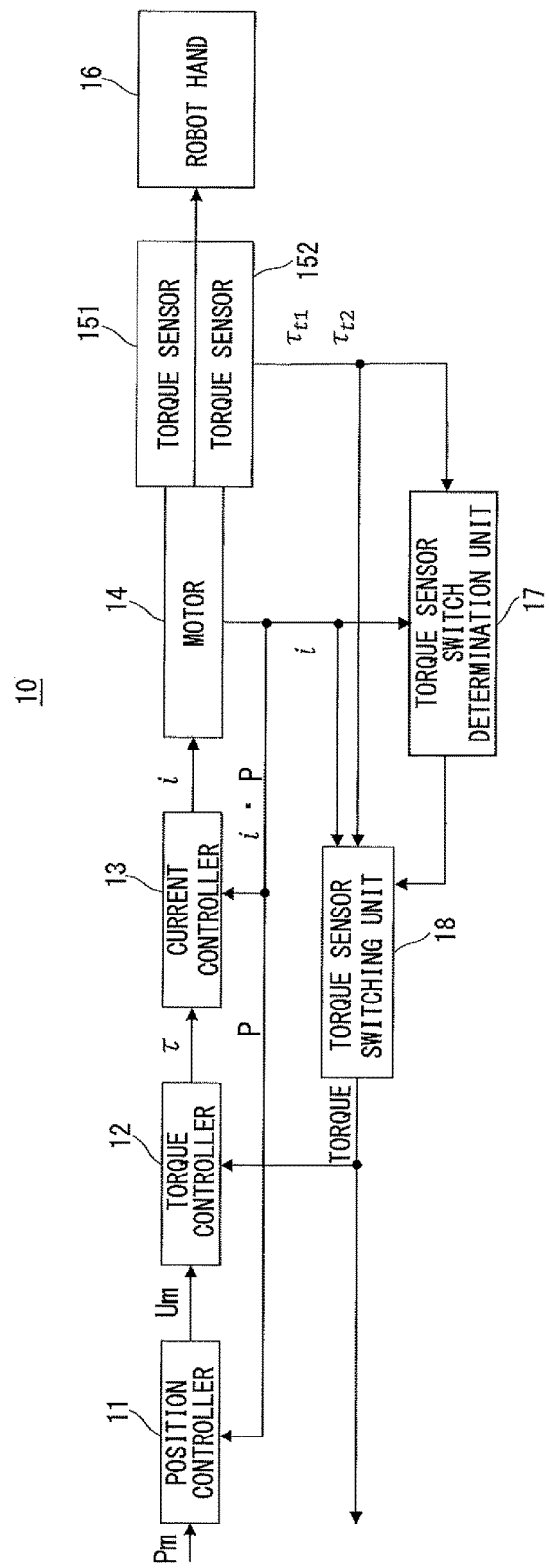
FIG. 1 is a block diagram showing a configuration of a torque control apparatus according to a first embodiment of the present disclosure.
Figure 2:
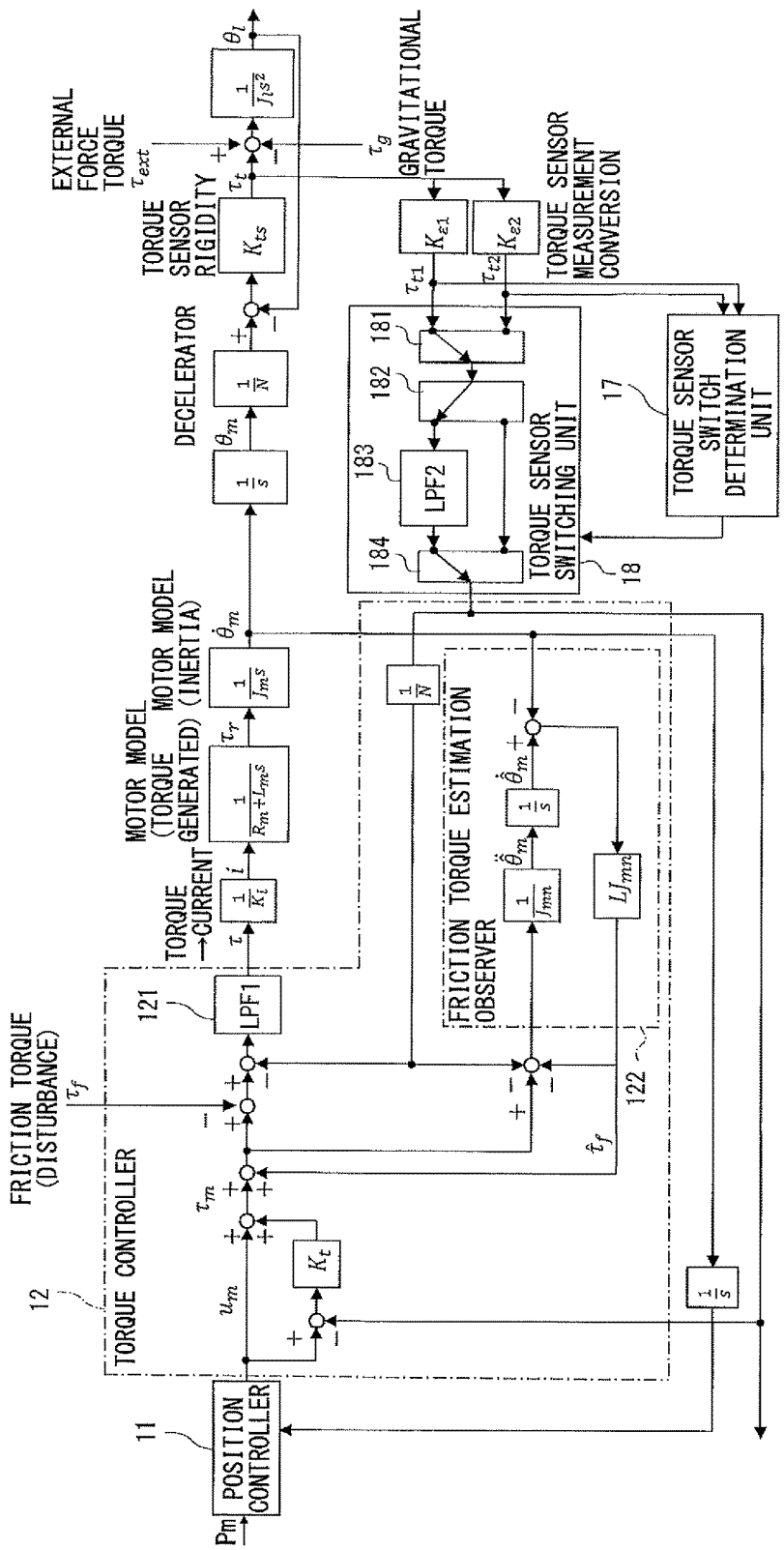
FIG. 2 is a block diagram showing an internal configuration of a torque control apparatus according to the first embodiment of the present disclosure.

FIG. 1 is a block diagram showing a configuration of a torque control apparatus 10 according to a first embodiment of the present disclosure. Further, FIG. 2 is a block diagram showing an internal configuration of a torque control apparatus according to the first embodiment of the present disclosure. In the following description, the explanation will be given mainly with reference to FIG. 1, and with reference to FIG. 2 as necessary.

The torque control apparatus 10 at least includes a position controller 11, a torque controller 12, a current controller 13, a motor 14, torque sensors 151 and 152, a robot hand 16, a torque sensor switch determination unit 17, and a torque sensor switching unit 18.

The position controller 11 accepts a position command Pm from an external device, accepts a current position P of the robot hand 16 from the motor 14, and generates a torque command Um in such a way as to make the position P close to the position command Pm to output the torque command Um that has been generated to the torque controller 12.

The torque controller 12 is one example of a torque command output unit. The torque controller 12 accepts the torque command Um and a torque value, generates a motor torque command τ, and outputs the motor torque command that has been generated to the current controller 13. In other words, the torque controller 12 calculates the torque command value (motor torque command τ) based on the target position of the robot hand 16 and the torque value detected by one of the plurality of torque sensors. Further, the torque controller 12 includes a first low pass filter (LPF 1_121) that cuts off the torque command value that has been calculated by a first frequency and outputs the obtained value to the current controller 13. The LPF 1_121 may be arranged between the torque controller 12 and the current controller 13.

The current controller 13 controls a current i to be input to the motor 14 based on the motor torque command τ. Specifically, the current controller 13 outputs the value obtained by multiplying the motor torque command τ by a predetermined coefficient to the motor 14 as the current i.

The motor 14 has a tip end in which the robot hand 16 is arranged and outputs a torque $\tau_1$ based on the input current i. The robot band 16 is one example of a load arranged in the tip end of the motor 14. Therefore, a robot arm, a leg or the like may be used in place of the robot hand 16.

The torque sensors 151 and 152 are examples of first and second torque sensors and respectively detect the torque $\tau_1$ output from the motor 14 as measured torque values $\tau_{t1}$ and $\tau_{t2}$. The number of torque sensors according to the present disclosure may be three or larger.

The torque sensor switch determination unit 17 and the torque sensor switching unit 18 are examples of a switching unit. The torque sensor switch determination unit 17 monitors the outputs from the torque sensors 151 and 152. When the torque sensor switch determination unit 17 detects that there is an abnormality in the torque sensor value (e.g., the measured torque value $\tau_{t1}$) that is currently selected is the output, the torque sensor switch determination unit 17 controls (a switch unit 181 of) the torque sensor switching unit 18 so as to select another torque sensor value (e.g., the measured torque value $\tau_{t2}$). The abnormality may be detected when, for example, the difference between the measured torque values $\tau_{t1}$ and $\tau_{t2}$, which are output from the torque sensors 151 and 152, is equal to or larger than a threshold, when the zero value continues to correspond to the number of outputs of the measured torque value $\tau_{t1}$, when the measured torque value $\tau_{t1}$ is continuously kept at the upper-limit value or the lower-limit value, or when the communication with the torque sensor 151 is interrupted.

The torque sensor switching unit 18 selects and switches the output from the torque sensor based on a selection instruction of the output of the torque sensor by the torque sensor switch determination unit 17. Further, the torque sensor switching unit 18 includes a second low pass filter (LPF 2_183) that cuts off the torque value by a second frequency and outputs the obtained value to the torque controller 12. It is assumed here that the second frequency in the second low pass filter is higher than the first frequency in the first low pass filter described above. Accordingly, since the amount of delay of the signal caused by the second low pass filter is small, the influence of the signal delay in the torque controller 12 can be reduced.

The torque sensor switching unit 18 filters the measured torque using the LPF 2_183 for a predetermined period of time after the torque sensors are switched (that is, switching by the switch unit 181). Then, after a predetermined period of time has passed, the torque sensor switching unit 18 outputs the measured torque to the torque controller 12 without using the LPF 2_183. For example, the torque sensor switching unit 18 configures switch units 182 and 184 in such a way that the LPF 2_183 is used for a predetermined period of time after the torque sensor is switched and the LPF 2_183 is not used after the predetermined period of time has passed. The torque sensor switching unit 18 configures the switch units 182 and 184 in such a way that the LPF 2_183 is not used and maintains this state when switching is not performed by the switch unit 181. Note that the predetermined period of time is a value calculated from the time constant of the LPF 2_183.

Figure 3:
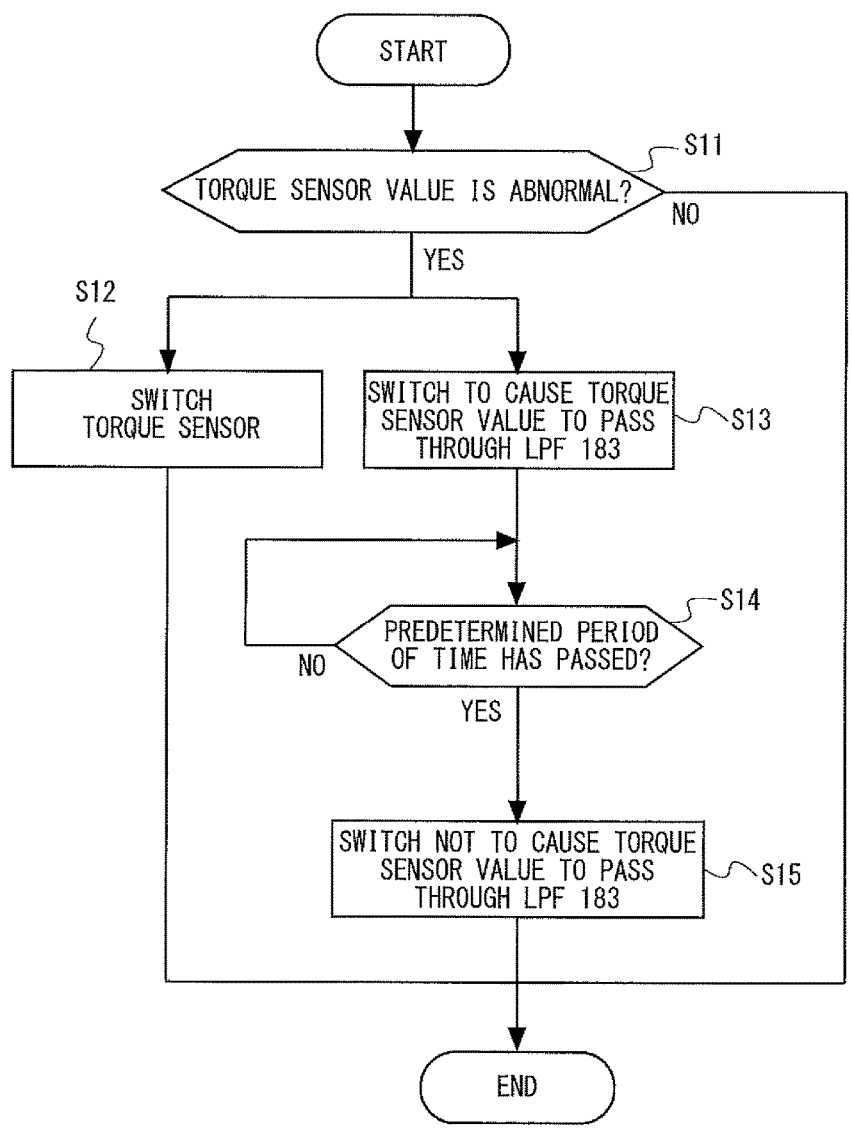
FIG. 3 is a flowchart showing a flow of torque sensor switching processing according to the first embodiment of the present disclosure.

FIG. 3 is a flowchart showing a flow of torque sensor switching processing according to the first embodiment of the present disclosure. First, the torque sensor switch determination unit 17 determines whether the torque sensor value is abnormal or not (S11). When it is determined that the torque sensor value is abnormal, the torque sensor switch determination unit 17 sends an instruction to the torque sensor switching unit 18 to switch the torque sensor. In accordance therewith, the switch unit 181 of the torque sensor switching unit 18 switches outputs of the torque sensors (S12). When, for example, the switch unit 181 selects the output of the torque sensor 151, the torque sensor switching unit 18 switches the switch unit 181 in such a way as to output the second torque value (e.g., measured torque value $\tau_{t2}$) detected by the torque sensor 152 to the switch unit 182 when the first torque value (e.g., measured torque value $\tau_{t1}$) detected by the torque sensor 151 satisfies a predetermined condition.

Further, when it is determined in Step S11 that the torque sensor value is abnormal, the torque sensor switching unit 18 switches, in parallel with Step S12, the switch units 182 and 184 in such a way as to cause the torque sensor value to pass through the LPF 2_183 (S13). After that, the torque sensor switching unit 18 determines whether a predetermined period of time has passed (S14). After the predetermined period of time has passed, the torque sensor switching unit 18 switches the switch units 182 and 184 so as not to cause the torque sensor value to pass through the LPF 2_183 (S15).

In place of Step S14, the torque sensor switching unit 18 may determine whether the torque sensor value before it passes through the LPF 2_183 substantially coincides with the torque sensor value after it has passed therethrough. Alternatively, before Step S13, the torque sensor switching unit 18 may configure the switch units 182 and 184 in such a way that the LPF 2_183 is not used without performing Steps S13 to S15 when the magnitude of the change in the torque sensor value output at the time of switching of the switch unit 181 is equal to or smaller than a threshold, and keep the state in which the LPF 2_183 is not used.

As described above, in this embodiment, the LPF is used only when a sudden change occurs in the signal when the torque sensors are switched. Therefore, in the normal operation, an unnecessary delay rarely occurs. Further, even when there is a sudden change in signals when the torque sensors are switched, it is possible to prevent a sudden change in the signal input to the subsequent torque controller 12 and to prevent saturation of control operations and oscillation by using the LPF 2_183.

As shown in FIG. 2, the torque controller 12 includes a friction torque estimation observer 122 therein. The friction torque estimation observer 122 cancels the friction of the torque sensor. The torque control apparatus 10 according to this embodiment includes the torque sensor switching unit 18 provided after the stage at which the torque $\tau_1$ is output. When an abnormality occurs in the torque sensor 151, the torque control apparatus 10 switches the torque sensor 151 to the torque sensor 152 and outputs the measured torque value $\tau_{t2}$. At this time, the signal that has passed through the LPF 2_183 is output for a predetermined period of time after the switching. Accordingly, it is possible to suppress the sudden change in the input to the friction torque estimation observer 122 at the time of switching, and to thus prevent saturation of calculations and oscillation in the friction torque estimation observer 122. That is, since it is possible to suppress the sudden change in the torque feedback signal (output signal from the Torque sensor switching unit 18), it is possible to prevent saturation of calculations and oscillation in the whole torque control system.

Further, in the normal operation in which the torque sensors are not switched, the torque sensor value (measured torque) is not passed through the LPF 2_183, whereby a fast signal that is originally used for the torque sensor can be input to the friction torque estimation observer 122. Therefore, an estimated error of the friction torque estimation observer 122 can be suppressed. Further, since there is no delay in the torque feedback signal, the response in the whole torque control system becomes fast.

Further, a device that corresponds to an LPF that is always used is included in the friction torque estimation observer 122. In some embodiments, the frequency of the LPF is between a first frequency and a second frequency. It is therefore possible to perform torque control more stably.

In other words, the features of this embodiment are as follows. That is, this embodiment includes the plurality of torque sensors, the first LPF that is used when the torque command value is switched to the current command value, and the second LPF that is used only when the torque sensors to be used are switched, including a case in which one torque sensor has failed. Of these two LPFs, the second LPF used at the time of switching cuts off a high frequency band.

As described above, by providing the first LPF, it is possible to suppress occurrence of resonance of machines. Further, the second LPF is used only at the time of switching, whereby it is possible to cause the torque sensor value to pass through the second LPF only when it is necessary. Therefore, it is possible to suppress a situation in which processing is performed by the second LPF more than necessary.

Further, since the second LPF is configured to cut off electric noise components included in the output of the torque sensor, cutoff processing is not performed more than necessary even when the second LPF is used.

As will be understood from the aforementioned description, even when the plurality of torque sensors are switched, it is possible to accurately perform torque control by the torque sensors while minimizing the influence caused by the delay in the second LPF.

Second Embodiment of Present Disclosure

A second embodiment of the present disclosure is a modified example of the aforementioned first embodiment. In the second embodiment, when both of the torque sensors 151 and 152 have failures, torque control is performed by a torque estimation value using a current value in place of the torque sensor value. For example, the switching unit accepts, besides the output of the first torque sensor and the output of the second torque sensor, the output of a third torque sensor (not shown) that calculates the torque estimation value using the current value. Then the torque sensors are switched based on the torque sensor values detected by the first to third respective torque sensors. That is, when the first or the second torque sensor is switched to the third torque sensor, the torque estimation value is passed through the second LPF for a predetermined period of time. It is therefore possible to further suppress the sudden change of the output at the time of switching. This method is particularly effective when the first or the second torque sensor is switched to the third torque sensor since the value dramatically changes in this case.

The present disclosure is not limited to the aforementioned embodiments and may be changed as appropriate without departing from the spirit of the present disclosure.

From the foregoing disclosure, it will be obvious that the embodiments may be varied in many ways. Such variations are not to be regarded as a departure from the spirit and scope of the disclosure, and all such modifications as would be obvious to one skilled in the art are intended for inclusion within the scope of the following claims.

What is claimed is:

1. A torque control apparatus comprising:
   a motor including a load arranged at a tip part thereof and outputting torque based on a current that is input thereto;
   a plurality of torque sensors each configured to detect an output value of the torque output from the motor;
   a torque command output unit configured to calculate a torque command value based on the output value of the torque detected by one of the plurality of torque sensors; and
   a current controller configured to control the current based on the torque command value, wherein
   the torque command output unit comprises a first low pass filter configured to cut off the torque command value by a first frequency and output a filtered torque command value to the current controller,
   the torque control apparatus further comprises a switching unit configured to switch, when a first torque value detected by a first torque sensor among the plurality of torque sensors satisfies a predetermined condition, a second torque value detected by a second torque sensor to the torque command output unit,
   the switching unit comprises a second low pass filter configured to cut off the second torque value by a second frequency and output a filtered second torque value to the torque command output unit, the switching unit uses the second low pass filter for a predetermined period of time after the switching, and outputs the second torque value to the torque command output unit without using the second low pass filter, and the second frequency is higher than the first frequency.

\* \* \* \* \*